Dec. 30, 1952 S. G. BEST 2,623,354
FUEL CONTROL WITH TEMPERATURE DATUM SHIFTER
Filed Jan. 12, 1951
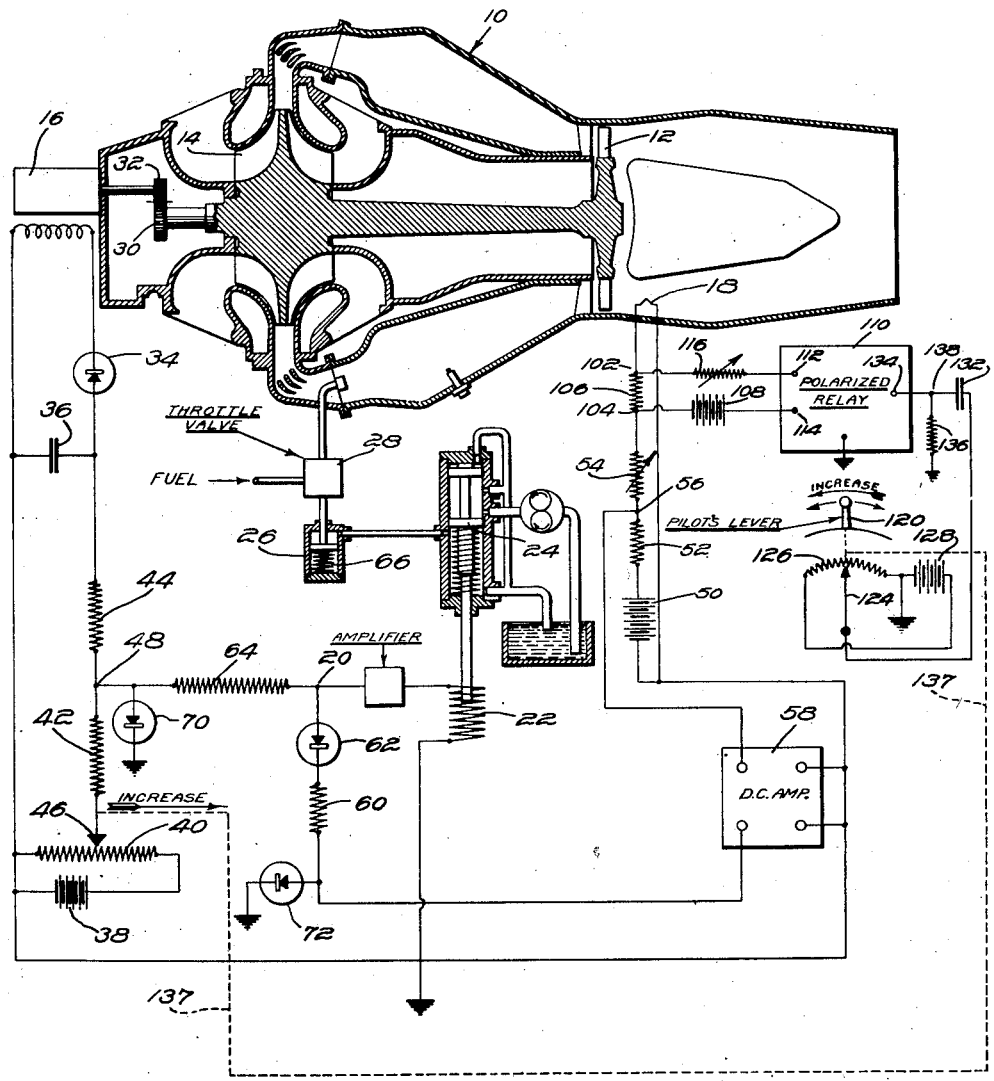
Inventor
Stanley G. Best
by Harris G. Luther
Attorney Patented Dec. 30, 1952

2,623,354

UNITED STATES PATENT OFFICE 2,623,354

FUEL CONTROL WITH TEMPERATURE DATUM SHIFTER

Stanley G. Best, Manchester, Conn., assignor to United Aircraft Corporation, East Hartford, Conn., a corporation of Delaware Application January 12, 1951, Serial No. 205,775

15 Claims. (Cl. 60—39.28)

This invention relates to a control mechanism particularly adapted for controlling fluid flow in an operating system such as a power plant.

It is an object of this invention to provide a control mechanism which responds to the departure of one or more parameters from preselected data for controlling said parameters and includes means for automatically selecting one of a plurality of data for at least one of the parameters.

A further object of this invention is to provide an electrical fuel control for a power plant which responds to deviations of engine speed and temperature from preselected data and creates a controlling signal for varying fuel flow while also selecting one of several data for said temperature deviations during certain engine operating conditions.

A still further object of this invention is to provide a temperature datum shifting circuit for a control mechanism of the type described in copending patent application Serial No. 205,521, filed January 11, 1951, by Stanley G. Best.

These and other objects will become readily apparent from the following detailed description of the drawing in which the single figure is a schematic view partly in section of a turbine engine and a control system according to this invention.

In a turbine-compressor type of engine particularly of the jet type some means must be provided for limiting the fuel flow to the engine to avoid both overspeeding and overheating of the engine. It is desired, however, to maintain a predetermined speed by the regulation of the fuel but at the same time to prevent an overheating of the turbine even when the speed control may call for more fuel in order to bring the speed up to a predetermined datum.

It is also desirable to reduce the speed and temperature as rapidly as possible to avoid harm to the engine and particularly if both the speed and temperature should happen to be above the predetermined datum. Under such conditions, it is desirable to use the signal, whether it is either speed or temperature which is the furthest from the datum as the controlling signal so as to produce the desired fuel flow as rapidly as possible.

From the above, it is apparent that in an engine which is to be controlled so as not to exceed a certain speed or a certain temperature, it is desirable to have a control structure which will reduce the fuel flow if either the speed or the temperature exceeds a predetermined datum and to utilize the signal which is furthest from the datum for reducing a fuel flow. Such a structure is provided in the device disclosed herein in which a turbine-compressor unit 10 having a turbine 12 and a compressor 14 drives a speed signal generating unit 16 which will create a signal having a voltage which will vary in accordance with speed of the turbine. A thermocouple 18 or other temperature responsive device is subjected to the temperature of a selected part of the turbine, shown as the exhaust from the turbine, and generates a signal whose voltage will vary with temperature. This voltage after being amplified is combined with the voltage from the speed signal generator at 20 and the resultant signal is led to a proportional solenoid 22. The proportional solenoid controls a valve 24 to direct fluid to or drain fluid from a servomotor 26 which controls a throttle valve 28 controlling the flow of fuel to the turbine-compressor unit.

From this structure, it will be apparent that the signal generators when properly combined will control the flow of fuel to the turbine and as the turbine speed and temperature are dependent upon the quantity of fuel consumed, it will be apparent that controlling the fuel will control both the speed and temperature.

The speed generator 16 which is driven from the engine by gears 30 and 32 generates an alternating current voltage which varies substantially directly in proportion to the engine speed. A rectifier 34 and a condenser 36 complete the circuit across the output of the speed signal generator so that the condenser 36 will be charged up to the peak voltage of the signal generated. A source of electrical energy indicated as a battery 38 provides a voltage across a voltage divider 40 connected through resistors 42 and 44 across the condenser 36. The slider 46 of the voltage divider 40 provides means for selecting a voltage to compare with the voltage generated by the speed signal generator and thus establishes a datum for the speed signal generator such that speed variation in one direction will provide a plus voltage at the juncture 48 and speed variation in the opposite direction will cause a minus voltage at the juncture 48. In the particular arrangement illustrated for the purpose of explaining the invention, the arrow in the rectifier 34 indicates current flow and hence an overspeed will produce a negative voltage at the juncture 48 and an underspeed will produce a positive voltage at the juncture 48.

The temperature responsive element 18 is connected in series with a source of electrical energy shown as a battery 50 and a pair of resistors 52 and 54 one of which 54 is adjustable for the purpose of determining the voltage at juncture 56 and thus selecting a datum for the temperature responsive element 18 and the temperature to be controlled by that element. The voltage at the juncture 56 is passed through an amplifier 58. The amplified voltage is led through a resistor 60 and a rectifier 62 to the juncture 20. The temperature responsive element 18 is connected with the energy source 50 in such a manner that an increase in temperature will cause the voltage at the juncture 56 to become more negative and a decrease in temperature will cause the voltage at that juncture to become more positive. It is to be understood that in referring to a particular polarity herein, such polarity can be reversed throughout if desired. In order to reverse the polarity of the controlling system it is only necessary to reverse the connections for rectifiers 62, 70 and 72, reverse the polarity of the signal output of the temperature and speed responsive elements and reverse the direction of response of the control valve actuating system.

The voltage at juncture 48 is led through a resistor 64 to the juncture 20 where it meets with the voltage from the temperature responsive mechanism. The arrow in the rectifier 62 indicates current flow and hence the rectifier becomes conducting when the element connected with the resistor 60 becomes more negative than the element connected with the resistor 64. The resistor or impedance 64 is made much larger, something in the order of ten times or more the resistance or impedance of the element 60 and the impedance or resistance of the proportional solenoid 22 may be in the order of twice the impedance or resistance of element 64. These differences in impedance or resistance become less important if an amplifier is used as shown between juncture 20 and solenoid 22. Hence when the voltage from the thermocouple 18 is more positive or less negative than the voltage from the speed signal generator 16, the rectifier 62 becomes non-conducting and the signal from the speed generator will control and position the proportional solenoid 22. As overspeed and overtemperature signals are negative voltages, they will call for a decrease in fuel. Hence if the speed signal generator is producing a negative voltage while it is controlling, it will move the valve 24 in a direction to close the throttle valve 28 which can be in a direction as shown in the figure such that the fluid is drained from the servomotor 26 allowing the spring 66 to close the throttle valve. If the signal from the speed signal generator is positive but is less positive than that from the temperature signal generator, it will still control but will move the valve 24 in a direction to open the throttle valve and admit more fuel to the turbine to increase its speed.

If, however, the temperature responsive signal is the more negative or the least positive, then the rectifier 62 becomes conducting and due to the large ratio between the impedances 60 and 64 will determine the voltage at the juncture 20 and hence the voltage controlling the proportional solenoid 22. Hence if the temperature at the control point (thermocouple 18) is above the selected datum, it will signal to reduce the fuel delivered to the turbine. If the temperature is below the selected datum, and is producing a signal less positive than the signal being produced by the signal generator, it will determine the voltage sent to the proportional solenoid and will call for an increase in fuel in an attempt to bring the temperature up to the selected datum.

In the usual normal operation, i. e. during slight variations of operating conditions of the turbine, the speed will vary faster than the temperature and the speed will ordinarily take over control and reduce the fuel flow before the temperature rises to the selected datum. However, during periods of acceleration and particularly near the peak output, it is possible to raise the temperature to dangerous limits before the speed is brought up to the selected speed. Under these conditions the temperature control will take over and prevent an overheating of the turbine.

Additional rectifiers 70 and 72 are provided in each of the signal networks (i. e. temperature and speed) and these act as limiters to prevent a high positive signal in either network from adversely effecting the controlling signal in the other network. In other words, it will prevent a low temperature from influencing the engine speed when the speed signal is controlling as in normal flight. Conversely the rectifiers 70 and 72 prevent a low speed from adversely influencing the temperature when temperature is controlling as in acceleration. Each of the rectifiers 70 and 72 have a bias (as for example, batteries or other source of power) to establish a predetermined limit for the positive signal in the network above which the rectifiers will conduct and thus limit the value of the positive signal in the network.

Repeating the above in somewhat different language, when the rectifier 62 is conducting, the speed signal to the controller 22 is dragged down to the level of the temperature signal, thus the temperature signal has complete control and the speed signal has no control. When the rectifier 62 does not conduct, the temperature signal is blocked off from the juncture 20 and has no efect on the speed signal to the controller. Thus the speed signal has complete control and the temperature has no control. As the rectifier 62 is conducting only when the element connected to the resistor 60 is more negative than the element connected to the resistor 64, it becomes obvious that if the temperature error signal is the least positive or more negative of the two signals, the rectifier conducts and temperature has control. If the speed error signal is the least positive or most negative of the two signals, the rectifier does not conduct and speed has control. Thus the circuit selects the signal calling for the least fuel.

It should be noted that although the least positive or most negative signal is utilized herein as the controlling signal, it may be desirable to use the most positive or least negative signal to control. In either case the controller can be stated as selecting the algebraically greatest of the signals in a preselected direction. Thus, if the least positive or most negative signal is being used as the controlling signal the algebraically greatest of the signals would be the one from which a negative number would be subtracted to give the other, and vice versa if the most positive or least negative signal is being utilized the algebraically greatest of the signals would be the one from which a positive number is subtracted to give the other.

The mechanism thus far described is disclosed and claimed in the above referred to co-pending patent application.

During sudden acceleration of the power plant as called for by increase throttle movement, it is desirable to have the power plant respond as quickly as possible. Hence although for continuous operation a certain temperature datum is preselected, a higher temperature datum may be used for short periods of time without injury to the various engine parts. As a result it is desirable to provide a higher temperature datum during acceleration for a preselected time interval, as for example 15 seconds, so as to avoid retarding of acceleration due to departures of temperature from the normal datum.

To this end the datum shifter for the temperature responsive signal network comprises a circuit connected adjacent the variable resistance 54. The shifter circuit primarily imposes an additional voltage of proper polarity into the temperature responsive signal network to modify the predetermined voltage applied by the preselected setting of the variable resistance 54. The datum shifter circuit impresses a voltage across points 102 and 104, between which points a resistor 106 is provided. The resistor 106 is chosen so that when current from battery 108 flows across the resistor 106 a predetermined voltage drop thereacross will be produced so as to effectively increase the preselected temperature datum setting to a higher temperature setting. The current of battery 108 will flow across resistor 106 whenever the polarized relay 110 closes the circuit across the contacts 112, 114. A variable resistance 116 may be provided to adjust the voltage being impressed across the resistor 106.

The polarized relay is energized in response to movements of the pilot's throttle lever 120 which lever may operate the throttle valve 28 in cooperation with the main controller and servomotor 26 or a different source of fuel flow may be controlled to the power plant. The lever 120 is operatively connected to the movable contact 124 of the potentiometer 126 which in turn receives its power from a battery 128. The movable contact 124 is operatively connected in series with a capacitor 132 and the terminal 134 on the polarized relay 110. A resistance 136 has one end connected to a point between the capacitor 132 and the terminal 134 while its other end is connected to ground. The throttle lever 120 may be connected mechanically to the slider 46 of the voltage divider or potentiometer 40. As illustrated herein an operative connection is shown by the dotted line 137 however it may be desirable to use the same potentiometer rather than to mechanically connect two separate potentiometers to the lever 120.

For any given setting of the throttle lever 120 and the movable contact 124, the capacitor will be charged to a certain value by energy from the battery 128. Under such a condition an equilibrium exists so that no voltage exists at the terminal 134 of the polarized relay 110. In the event that the lever 120 is moved suddenly in one direction to a new position the movable contact 124 will attempt to impress a different voltage across the capacitor 132. However, the resistor 136 is of sufficient value to delay the application of this new voltage for a certain time interval so that a voltage will exist for a period at the terminal 134 of the relay 110. The capacity of the capacitor 132 and the resistance of resistor 136 together will determine the extent of this time delay following which the new voltage drop across the capacitor 132 reaches equilibrium. Since it is desired to shift to the new temperature datum for a preselected time only during acceleration the polarized relay will close across terminals 112, 114 only when the throttle lever is moved in a power increasing direction. Thus the relay 110 will tend to connect terminals 112, 114 only when the current flow at terminal 134 is of a polarity commensurate with throttle increase. The relay 110 may be made ineffectual when the polarity is consistent with the throttle decrease movements. As a result it can be seen that a new datum setting of a higher temperature level will be made operative for a predetermined interval of time whenever acceleration or power increase is called for. As described herein the time interval will vary with the amount of burst or surge caused by the degree of sudden movement of the lever 120.

The datum shifter illustrated and described herein may also take the form of a vacuum tube and appropriate circuit or it may be desirable to utilize a rectifier in conjunction with the resistor 136-capacitor 132 combination and thus produce the effect of a polarized relay in order to impress a voltage across resistor 106.

On the other hand, it may also be preferable to cut in an additional resistance in the temperature responsive network by means of a relay or other mechanism rather than impressing a voltage into the temperature responsive network. Also the time delay function may readily be produced by a mechanical expedient such as a dashpot or escapement mechanism.

Although only one embodiment of this invention has been illustrated and described herein, it will be apparent that various changes and modifications may be made in the configuration and arrangement of the component parts without departing from the scope of this novel concept. Thus, similar structure may be readily used to control the operation of a system where the signal calling for maximum flow rather than minimum fuel flow is desired as a controlling signal at the output of the controller.

What it is desired to obtain by Letters Patent is:

1. In combination, means for generating a signal responsive to the value of a parameter to be controlled, means for establishing a predetermined datum for said parameter, means for producing a resultant signal varying between positive and negative values commensurate with the direction and extent of departure of said parameter from said datum, a second parameter to be controlled, control means for varying said second parameter including mechanism adjustable in two directions, a second datum for said first parameter, means for shifting from said first datum to said second datum, and means associated with said control means for operating said shifting means in response to movement of said mechanism in one of said two directions.

2. In combination, means for generating a signal responsive to the value of a first parameter to be controlled, means for establishing a predetermined substantially fixed datum for said parameter, means for generating a second signal responsive to the value of another parameter to be controlled, means for establishing a variable datum for said other parameter including an element movable in two directions, combining means for combining said signals and for producing a resultant signal varying between positive and negative values commensurate with the direction and extent of the relative departures of said parameters from said data, means providing a second substantially fixed datum for said first parameter, and means associated with said movable element for placing said second fixed datum into operation in response to movement of said movable element in one of said two directions.

3. In a combination according to claim 2 in which said last mentioned means includes elements for placing said second fixed datum into operation for a predetermined time interval and subsequently removing said second datum from operation.

4. In a device, means for producing an electrical signal variable in accordance with a variable of the device, means for producing an electrical datum above and below which said signal will vary, means for changing said datum comprising a resistor and a capacitor operatively connected in series to a source of potential and means for varying said potential, said resistor and capacitor combination having a predetermined time constant whereby a voltage is produced across the resistor for a time interval dependent upon variations in said potential, a polarity sensitive device operative in response to the voltage produced across said resistor and operatively connected thereto, and electrical elements responsive to the operation of said polarity sensitive device for impressing a voltage to modify said datum.

5. In a controlling system having a plurality of parameters to be controlled, means for producing signals corresponding to the value of said parameters, means for establishing a preselected datum for each of said parameters and producing a resultant signal commensurate with the departure of said parameters from their respective data in positive and negative directions, comparator means for selecting one of said resultant signals to produce a controlling final signal dependent upon the relative departure of said parameters from their respective data, and means for providing at least one other datum for at least one of said parameters including means for shifting from the preselected datum to the other datum for said one parameter.

6. In a controlling system having a plurality of parameters to be controlled, means for producing signals corresponding to the value of said parameters, means for establishing a preselected datum for each of said parameters and producing a resultant signal commensurate with the departure of said parameters from their respective data in positive and negative directions, comparator means for selecting one of said resultant signals to produce a controlling final signal dependent upon the relative departure of said parameters from said data, and means for providing at least one other datum for at least one of said parameters including means for shifting from the preselected datum to the other datum for said one parameter for a predetermined time interval, said shifting means comprising time delay elements operatively connected thereto.

7. In combination, means for generating a first signal responsive to a first parameter to be controlled, means for generating a second signal responsive to a second parameter to be controlled, electrical means for establishing a predetermined datum for each of said parameters, means for producing resultant signals from said first and second signals having polarity and values commensurate with the direction and extent of departure of said parameters from their respective data, comparator means for comparing the resultant signals including elements for producing a final signal which is the algebraically greatest of said resultant signals in a preselected direction, means responsive to the polarity and value of said final signal for controlling said parameters, means providing an auxiliary datum for at least one of said parameters, and means for shifting to said auxiliary datum.

8. In a fuel control mechanism responsive to two parameters of operation of an engine, a source of fuel under pressure, means for injecting said fuel into the engine, a throttle valve for controlling the flow of fuel to said injecting means, means for generating first and second signals responsive to the value of each of said parameters respectively, electrical means for establishing a predetermined datum for each of said parameters, means for producing resultant signals from said first and second signals having polarity and values commensurate with the direction and extent of departure of said parameters from their respective data, comparator means for comparing said resultant signals including elements for producing a final signal which is the algebraically greatest of said resultant signals in a preselected direction, means responsive to the polarity and value of said final signal for moving said valve in fuel increasing and decreasing directions, means for controlling the signal for one of said parameters including a member movable in two directions, means providing an auxiliary datum for the other of said parameters, and means for shifting to said auxiliary datum including elements associated with said movable member.

9. In a fuel control mechanism according to claim 6 wherein said shifting means further responds for a time interval dependent upon the degree of movement of said member in said one direction including electrical time delay elements operatively connected to said movable member.

10. In a fuel control mechanism according to claim 5 wherein said shifting means is responsive to movement of said member in only one direction.

11. In a combination according to claim 10 wherein said shifting means comprises a resistor and a capacitor operatively connected in series to a source of potential, said member including elements for varying the potential delivered to said resistor and capacitor, said resistor and capacitor combination having a predetermined time constant whereby a voltage is produced across the resistor for a time interval dependent upon variations in said potential, a polarity sensitive device operative in response to the voltage produced across said resistor and operatively connected thereto, and electrical elements responsive to operation of said polarity sensitive device for impressing a predetermined voltage to modify the resultant signal for the other of said parameters.

12. In combination, a power plant having a burner and a turbine, means for injecting fuel into said burner, a first means for regulating the flow of fuel to said injecting means, means responsive to the speed of the turbine for generating a first signal, electrical means establishing a preselected speed datum for varying said first signal and producing a resultant speed signal, means responsive to the temperature adjacent said turbine for generating a second signal, electrical means establishing a preselected temperature datum for varying said second signal and producing a resultant temperature signal, means for combining said resultant signals including mechanism for operating said first regulating means, a second means operatively connected to said regulating means for effecting the flow of fuel to said injecting means and movable in turbine accelerating and decelerating directions, electrical means associated with said second regulating means for establishing an auxiliary temperature datum and operatively connected to said electrical means which establish the preselected temperature datum, and mechanism responsive to movement of said second regulating means in a turbine accelerating direction for engaging said auxiliary temperature datum to modify said resultant temperature signal including electrical elements responsive to said movement.

13. In a combination according to claim 8 wherein said mechanism for engaging said auxiliary temperature datum comprises electrical timing elements for engaging said auxiliary datum for a time interval and wherein said second regulating means includes electrical elements responsive to the degree of accelerating movements thereof for determining the extent of said time interval.

14. In a compressor-turbine engine having a combustion chamber receiving air from the compressor and exhausting hot gases into the turbine, a source of fuel under pressure, means for controlling the flow of fuel to said burner, means for regulating said controlling means in fuel increasing and decreasing directions including electrical elements responsive to the strength and polarity of a final signal received thereby, electrical generating means responsive to the speed of the turbine including electrical elements for impressing a preselected biasing voltage to modify the signal generated by said last mentioned generating means, said biasing voltage establishing a speed datum, a temperature responsive electrical element positioned in the gas stream adjacent said turbine for generating a second signal varying with the temperature of the gas, electrical means for impressing a biasing voltage to modify said second signal, said second mentioned biasing voltage establishing a temperature datum, means for combining said modified signals and producing a final signal to be received by the electrical elements of said regulating means, a manual control for regulating said controlling means including an element movable in turbine accelerating and decelerating directions, auxiliary electrical means for impressing an auxiliary biasing voltage and establishing an auxiliary temperature datum higher than said first mentioned temperature datum, and means responsive to accelerating movements of said manual control for shifting to said higher temperature datum commensurate with the period of acceleration including electrical elements operatively connected to said manual control.

15. In a compressor-turbine engine according to claim 14 wherein said shifting means comprises a variable resistance operatively connected to said movable member, a capacitor having one side thereof connected to said resistance, and a polarity sensitive unit forming a bridge with the other side of said capacitor and said temperature responsive element.

STANLEY G. BEST.

REFERENCES CITED

The following references are of record in the file of this patent:

UNITED STATES PATENTS

| Number | Name | Date |
| --- | --- | --- |
| 2,525,636 | Bedford | Oct. 10, 1950 |
| 2,540,916 | Sparrow | Feb. 6, 1951 |
| 2,558,592 | Starkey | June 26, 1951 |